R. ANDERSON.
DRIFT FOR STAYBOLT SLEEVES.
APPLICATION FILED JULY 16, 1919.
1,330,673.
Patented Feb. 10, 1920.
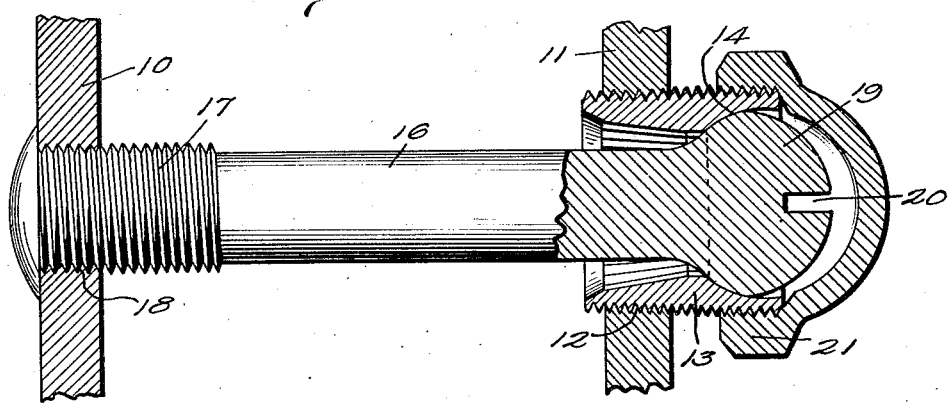
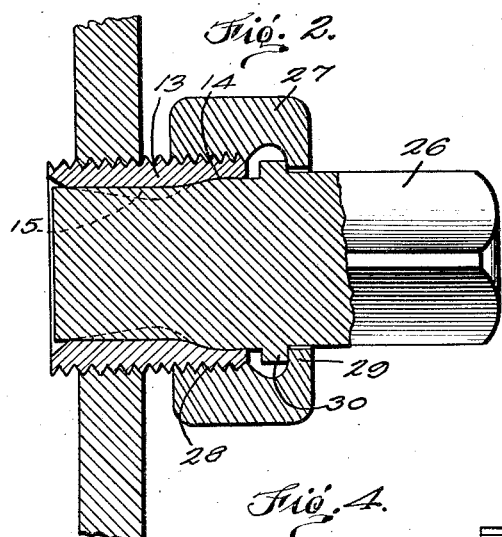
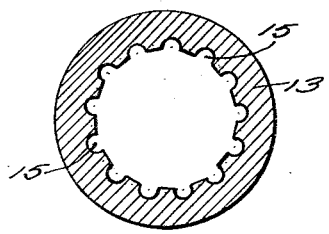
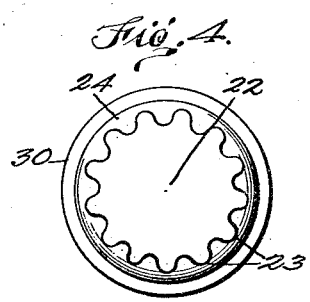
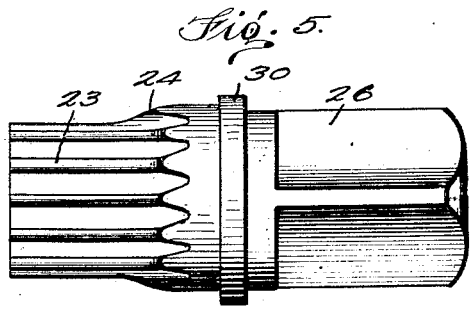
Inventor:
Ross Anderson.
C. L. Parker.
Atty.

UNITED STATES PATENT OFFICE.

ROSS ANDERSON, OF RICHMOND, VIRGINIA.

DRIFT FOR STAYBOLT-SLEEVES.

1,330,673.   Specification of Letters Patent.   Patented Feb. 10, 1920.

Application filed July 16, 1919. Serial No. 311,281.

*To all whom it may concern:*

Be it known that I, Ross ANDERSON, a citizen of the United States, residing at Richmond, in the county of Henrico and State of Virginia, have invented certain new and useful Improvements in Drifts for Staybolt-Sleeves, of which the following is a specification.

This invention relates to new and useful improvements in drifts for stay bolt sleeves.

As at present constructed, the type of stay bolt known as flexible is provided with a rounded head to allow of movement of the plates which the bolt is designed to connect, due to expansion and contraction from heat and cold to which these plates are subjected. This rounded head is seated in the sleeve having threaded engagement with one of the plates and a cap is placed over the sleeve to form a water-tight joint. In placing these sleeves in position, it has hitherto been the practice to give the sleeve several turns with the hand to start the threads in the plate and then apply a power driver having a head provided with internal screw threads which engage upon the heads of the sleeve. It will be obvious that this method of insertion is undesirable in that the head has a tendency to jam upon the threads and is difficult to remove. Furthermore, in removing the sleeve, the use of the power driver is impossible as the threads of the head thereof will have a tendency to run off the threads of the sleeve. These sleeves therefore, are removed by the use of a pipe wrench which destroys the threads engaged and renders the sleeve unfit for further use.

These objections I have overcome by forming serrations in the interior of the sleeve and providing a driver or drift having ribs adapted to enter the serrations of the sleeve. When inserting the sleeve, it is merely necessary to insert the driver therein and drive the sleeve home and the driver may be readily removed, without loss of time. When it is desired to remove the sleeve, a locking nut is placed upon the driver having interior threads which engage the exterior threads of the sleeve and hold the driver firmly in position and prevent its backing out when power is applied. This is an important feature as these sleeves, when they have been in position for some time, become rusted and are held very firmly and require considerable pressure before they will start.

Furthermore, in the present form, the dirt, rust and common boiler sediment have a tendency to gather around the head of the bolt within the sleeve and harden there, thus materially interfering with the action of the bolt. In my device, the serrations formed in the sleeve allow free circulation of the water around the head of the bolt and thus prevent settling of the sediment within the sleeve.

Other objects and advantages of the invention will be apparent during the course of the following description.

In the accompanying drawings forming a part of this specification and in which like numerals are employed to designate like parts throughout the same, Figure 1 is a side elevation, partly in section, of the stay bolt embodying my invention, Fig. 2 is a sectional view, showing the driver in position for removing the sleeve, Fig. 3 is a sectional view through the sleeve, showing the serrations therein, Fig. 4 is an end elevation of the driver, and, Fig. 5 is a side elevation thereof.

Referring now more particularly to the drawings, wherein for the purpose of illustration is shown a preferred embodiment of my invention, the numerals 10 and 11 represent boiler plates forming the spaced sides of a water space in the boiler. The plate 11 is provided with a threaded opening 12, which receives an externally threaded sleeve 13. This sleeve is provided adjacent the outer end of the interior thereof with a concave seat 14 and the interior of the body of the sleeve provided with longitudinal grooves 15, extending into the seat 14, for a purpose presently to appear.

The stay bolt 16 is provided upon one end with threads 17, adapted to enter a threaded opening 18, formed in the plate 10, extending between the plates 10 and 11. The bolt is shown as provided with a rounded head 19, fitting the seat 14 of the sleeve 13. This bolt is provided in the head with the usual slot 20, adapted to receive the driver by which the threads 17 are engaged with the threaded opening 18, of the plate 10. The outer end of the sleeve 13 is closed by a cap 21, in the usual manner.

A drift or driver 22 is provided, this driver having upon one end thereof longitudinal ribs 23, adapted to engage in the grooves 15 of the sleeve 13. These ribs are enlarged as at 24, forming a surface corresponding to the seat 14 of the sleeve 13. The drift is supplied with the shank 26, which may be driven by wrench, power or the like.

By referring to Fig. 2, it will be seen that the drift engages considerable of the metal of the sleeve 13, thus giving the drift a very firm grip. To remove this sleeve, a nut 27 is provided, having interior threads 28 adapted to engage the threads upon the exterior of the sleeve 13. This nut is also provided with a flange 29, which engages against the shoulder 30, formed upon the drift and forces the drift into firm engagement with the sleeve and prevents any tendency of the drift to back out when power is applied thereto.

The operation of my device is so simple and apparent to render further discussion thereof unnecessary.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A drift for inserting and removing stay bolt sleeves provided interiorly with a seat adapted to receive the head of a stay bolt and having longitudinal grooves extending into said seat, said drift being provided with ribs adapted to enter the grooves in said sleeve, and with an enlarged portion conforming to the shape of and adapted to abut said seat.

2. A drift for inserting and removing stay bolt sleeves provided interiorly with a concave seat adapted to receive a rounded head of a stay bolt and having longitudinal grooves extending into said seat, said drift being provided with ribs adapted to enter the grooves in said sleeve and with an enlarged portion conforming to the shape of and adapted to abut said seat, and means for holding said enlarged portion in engagement with said seat.

3. A drift for inserting and removing stay bolt sleeves provided interiorly with a seat adapted to receive the head of a stay bolt and longitudinal grooves extending into said seat and exteriorly with screw threads, said drift being provided with ribs adapted to enter the grooves in said sleeve and with an enlarged portion conforming to the shape of and adapted to abut said seat, and means for holding said shoulder in engagement with said seat, comprising a shoulder formed on said drift, a nut adapted to engage the threaded exterior of the sleeve and a flange formed on said nut adapted to engage the shoulder on said drift.

In testimony whereof I affix my signature in the presence of two witnesses.

ROSS ANDERSON.

Witnesses:
 A. S. WARX,
 C. D. JEFFRESS.